United States Patent
Grobben et al.

(10) Patent No.: US 12,404,119 B2
(45) Date of Patent: Sep. 2, 2025

(54) SYSTEM FOR SORTING PRODUCTS, METHOD FOR SORTING PRODUCT, AND COMPUTER PROGRAM PRODUCT

(71) Applicant: Vanderlande Industries B.V., Veghel (NL)

(72) Inventors: Koen Maarten Geert Grobben, Veghel (NL); Petrus Theodorus Cornelis Vervoort, Veghel (NL); Thomas Hendrikus Peeters, Veghel (NL)

(73) Assignee: Vanderlande Industries B.V., Veghel (NL)

( * ) Notice: Subject to any disclaimer, the term of this patent is extended or adjusted under 35 U.S.C. 154(b) by 208 days.

(21) Appl. No.: 18/270,515

(22) PCT Filed: Jan. 3, 2022

(86) PCT No.: PCT/NL2022/050001
§ 371 (c)(1),
(2) Date: Jun. 30, 2023

(87) PCT Pub. No.: WO2022/146141
PCT Pub. Date: Jul. 7, 2022

(65) Prior Publication Data
US 2024/0059498 A1    Feb. 22, 2024

(30) Foreign Application Priority Data

Jan. 4, 2021 (NL) ...................................... 2027263

(51) Int. Cl.
*B65G 47/50* (2006.01)
*B07C 3/08* (2006.01)
(Continued)

(52) U.S. Cl.
CPC .............. *B65G 47/503* (2013.01); *B07C 3/08* (2013.01); *B65G 43/08* (2013.01); *B65G 47/844* (2013.01);
(Continued)

(58) Field of Classification Search
CPC .... B65G 47/503; B65G 43/08; B65G 47/844; B65G 2811/0673; B07C 3/08; H01Q 13/203; H04W 88/08
(Continued)

(56) References Cited

U.S. PATENT DOCUMENTS 11,447,344 B2 * 9/2022 Grobben .................. B07C 3/08

FOREIGN PATENT DOCUMENTS

DE       102010022156 A1   11/2011
WO       WO-0224557 A1 *    3/2002
WO       WO-2020022896 A1 * 1/2020

OTHER PUBLICATIONS

International Search Report and Written Opinion of the International Searching Authority issued in corresponding application PCT/NL2022/050001 mailed Mar. 28, 2022 (12 pages).

* cited by examiner

*Primary Examiner* — Gene O Crawford
*Assistant Examiner* — Lester Rushin, III
(74) *Attorney, Agent, or Firm* — Carter, DeLuca & Farrell LLP

(57) ABSTRACT

System (1) for sorting products, comprising: •—a conveyor (11) comprising carrying bodies (113) one after another, extending parallel to each other, the carrying bodies associated with a pusher body (114), an electric motor (117) for moving the pusher body along the carrying body in a sort direction, •—a central control server (12) arranged for transmitting destination data relating to a sorting loca-
(Continued)

tion•—a plurality of controllers (13), in communication with the central control server and moveable in the transport direction, each to control two or more electrical motors in accordance with destination data received from the central control server, •—a stationary Access Point, AP (14), communicating with the server, and•—a pair of stationary radiating cables (15, 16) connected to the AP, one radiating cable extending in the transport direction and the other radiating cable extending against the transport direction, the radiating cables arranged for communication with the controllers.

13 Claims, 4 Drawing Sheets

(51) Int. Cl.
  *B65G 43/08*     (2006.01)
  *B65G 47/84*     (2006.01)
  *H01Q 13/20*     (2006.01)
  *H04W 88/08*     (2009.01)
(52) U.S. Cl.
  CPC .... *B65G 2811/0673* (2013.01); *H01Q 13/203* (2013.01); *H04W 88/08* (2013.01)
(58) Field of Classification Search
  USPC ..................................................... 198/349.6
  See application file for complete search history.

SYSTEM FOR SORTING PRODUCTS, METHOD FOR SORTING PRODUCT, AND COMPUTER PROGRAM PRODUCT

CROSS-REFERENCE TO RELATED APPLICATIONS

This application is a National Stage Application under 35 U.S.C. § 371 (a) of PCT/NL2022/050001, filed Jan. 3, 2022, which claims the benefit of and priority to Netherlands Patent Application No. 2027263 filed Jan. 4, 2021. The entire contents of the foregoing applications are incorporated by reference herein.

BACKGROUND

The present invention relates to a system for sorting products, comprising a conveyor that is moveable in a transport direction over a path along which a number of sorting locations are provided, the conveyor comprising a number of elongated carrying bodies located one after another and extending in a direction perpendicular to the transport direction and parallel to each other, the carrying bodies being configured for carrying the products to be sorted, all or a subset of the carrying bodies being associated with a pusher body to form a carrying-pusher body combination, each carrying-pusher body combination being provided with a pusher body displacement device comprising an electric motor, for moving the pusher body along the carrying body in a sort direction transverse to the transport direction, for pushing a product carried by the carrying body off of the carrying body.

In the PCT patent application PCT/NL2019/050488, a system of this kind is described. This particular patent application focuses on the concept that the system comprises a distance-determining device that is configured for determining a distance parameter that is related to the, or at least a, distance viewed in the sorting direction between a pusher body of a combination, of which the carrying body carries a product to be sorted and the product to be sorted carried by the carrying body and for sending the distance parameter to an on-board control system, wherein the on-board control system is configured for controlling an on-board driving device of the combination on the basis of this distance data.

The system described above has the drawback that the communication topology is left in the middle. The central server is to provide data to the controllers associated with the combinations, but there is no effective topology described to accomplish this particular aspect. The present invention aims to provide a system for sorting products having an effective communication topology for exchanging data between the central control server and the plurality of controllers.

SUMMARY

As such, in a first aspect according to the present invention there is provided a system for sorting products comprising:

a conveyor that is moveable in a transport direction over a path along which a number of sorting locations are provided, the conveyor comprising a number of elongated carrying bodies located one after another and extending in a direction perpendicular to the transport direction parallel to each other, the carrying bodies being configured for carrying the products to be sorted, all or a subset of the carrying bodies being associated with a pusher body to form a carrying-pusher body combination, each carrying-pusher body combination being provided with a pusher body displacement device comprising an electric motor, for moving the pusher body along the carrying body in a sort direction transverse to the transport direction, for pushing a product carried by the carrying body off of the carrying body, a central control server arranged for transmitting destination data relating to a sorting location where a product to be sorted is to be pushed off of the carrying body, a plurality of controllers, arranged in communication with the central control server and moveable in the transport direction along with a carrying body or a group of carrying bodies, each one of the controllers being arranged to control two or more of the electrical motors of the pusher body displacement devices in accordance with destination data received from the central control server, at least one stationary Access Point, AP, arranged to communicate with the central control server, and a pair of stationary radiating cables connected to the AP, one radiating cable of the pair extending in the transport direction with respect to the AP and the other radiating cable of the pair extending against the transport direction with respect to the AP, the pair of radiating cables arranged for communication with the plurality of controllers.

In accordance with the present invention, the conveyor may e.g. be of the endless type, forming a closed circuit with an upper loop portion defining the path along which the sorting locations are provided and the products are transported, and a lower loop portion as return path. The conveyor may e.g. be a conveyor belt, or in principle may be any other type of conveyor.

For example, the conveyor may be driven by a conveyor displacement device, as is well known in the art of conveyors.

The products to be sorted may be pushed onto, or placed on top of, the elongated carrying bodies. The dimensions of the elongated carrying bodies, seen in a transport direction of the conveyor, may be such that a product spans at least two consecutively situated elongated carrying bodies. As such, at least two pusher bodies are to be controlled together in order to push the product off of the respective elongated carrying bodies.

All or a subset of the elongated carrying bodies are provided with a pusher body. The pusher body is able to move with respect to the carrying body, in the sorting direction. The sorting direction is transverse to the transport direction. An electric motor, for example a Direct Current, DC, motor, is provided for each carrying-pusher body combination, for moving the pusher body in the sorting direction along the carrying body. In operation, the pusher body is pushed against the product to be sorted such that the product to be sorted is pushed from its corresponding elongated carrying body.

Operation of the electric motor of the pusher body displacement device, and thereby movement of the pusher body, is controlled by a controller. The controllers are moveable in the transport direction along with a carrying body or a group of carrying bodies. In other words, with respect to the "fixed world", such as a building in which the sorting system is installed, the controllers are moveable. Instructions for operation of the electric motors of the pusher body displacement devices, corresponding to destination data, are received from the central control server with which the controllers communicate.

In contrast to the moveable controllers, the central control server is e.g. stationary. In a typical implementation, the server may e.g. be located near the sorting system, but in a typical implementation the server could alternatively be "in the cloud"; the server being located at a position remote from the building in which the sorting system is installed.

To allow—when the sorting system is in operation—communication between the moving controllers and the central control server, a layered communication architecture is provided. A top level of the layered architecture, the "master", is the central control server. The bottom level of the layered architecture, the "operator", is the controller. In between the central control server and the controller are arranged a stationary Access Point, AP, and a pair of stationary radiating cables. As stated before, a part of the communication architecture is stationary while a part of the communication architecture is moveable.

The stationary AP, stationary with respect to the "fixed world", is arranged to communicate with the central control server. The radiating cables, also stationary with respect to the "fixed world" are connected to the AP. The controllers, moveable with respect to the "fixed world", move along with the conveyor. Destination data transmitted by the central control server is first sent to the AP, and from the AP is transmitted along the radiating cables. The cables emit and receive signals along the length of the cable, acting as an elongated antenna. due to which the destination data can be picked up by the controller as they move along the radiating cables, in particular by an antenna associated with the controller.

In this way, the stationary radiating cables, which may e.g. be leaky coax cables, enable the communication initiated by the central control server to go from a static, stationary environment, "the fixed world", to a moving environment.

The inventors have found that, by providing the radiating cables which are connected to the AP in pairs, wherein in particular one radiating cable of the pair extends against—or opposite to—the transport direction of the conveyor with respect to the AP and the other radiating cable of the pair extends in the transport direction of the conveyor with respect to the AP, the cables thus extending in opposite directions, a minimum number of components is needed to obtain a robust, reliable and efficient communication architecture.

Each of the radiating cables is connected with at least one end to the AP. A free end will be connected to a terminating impedance. The AP may be connected to a cable at two sides thereof, or two cables may be connected to one side of the AP. More specifically, in embodiments only a single AP may suffice to cover communication over a path length of up to 250 or 300 meter.

As one of the radiating cables of the pair extends against the transport direction with respect to the AP and one of the radiating cables of the pair extends in the transport direction with respect to the AP, when seen along the transport path of the conveyor, the AP may be placed away from the start point of the transport path as well as away from the end point of the transport path. In embodiments the AP may be placed at or near a central position of the path (central being relative to the start point and the end point of the path), although it is certainly not necessary that the AP is placed in the middle of the path—even when this may be desirable.

The inventors have found that the above described communication architecture has several advantages.

Firstly, with two radiating cables, both being connected to the same AP and extending in different directions, there is a relatively long path length along which the controllers and the conveyor pick up the same signal. A long path length may thus be realized without the need for roaming, roaming being defined, as known to one skilled in the art, as a change in communication path between the controller and one communication source, such as a first AP, to another communication path between the same controller and a different source, such as a second AP. Preferably, when the path is shorter than about 300 m, or about 250 m, or about 200 m, roaming may be avoided at all as the same signal, transmitted by the radiating cables, can be picked up over the entire length of the path.

Secondly, with the communication architecture as described herein, it becomes possible to realize an effective architecture, over a relatively long path length, with just a single AP. In embodiments described in the below the use of two APs is actually presented as advantageous over one AP, but the system works properly with one AP as well. The use of just one (or: two) AP(s) is a significant reduction compared to the architecture of known communication architectures. Thirdly, when there are less APs there is also less wiring from a central position, e.g. the central control server, to the different APs, again reducing the complexity of the architecture.

Fourthly, as the central control server and the controllers are no longer connected physically to each other by cables—but rather: communicate via the radiating cable—a lot of wiring can be omitted, especially in the part of the conveyor that moves with respect to the "fixed world".

In this way, the objectives are achieved.

The system in accordance with the present disclosure and, more specifically, the communication architecture used in the system may utilize different kinds of communication technologies, for example Wireless Local Area Network, WLAN, such as Bluetooth, Zigbee, WIFI and 5G.

Preferably, WLAN is the communication technique that is used for the communication technology as WLAN may support the bitrates that are required by the system. As mentioned above, the system may comprise a plurality of controllers, and each of these controllers may need to communicate with the central control server. The total amount of data packets that are exchanged between the central control server and the plurality of controllers may add up. The inventors have found that WLAN may support such type of communications.

In an example, each controller of the plurality of moveable controller is arranged to control at most 32 of the pusher body displacement devices. For example, each controller may be arranged to control between 8 and 32 of the pusher body displacement devices, such as between 8 and 16 of the pusher body displacement devices.

In principle, from a control perspective, there is not really an upper limit as to how many of the pusher body displacement devices may be controlled by a single controller, and from a perspective of minimizing the number of components, the more pusher body displacement devices controlled by one controller the better. However, when a controller fails, for whatever reason, all pusher body displacement devices controlled by that controller become uncontrollable and the products on the elongated carrying bodies of the conveyor associated with these pusher body displacement devices cannot be sorted. From that perspective, the number of pusher body displacement devices controlled by one controller should be kept moderate. Practical tests have shown that a loss in control of up to 32 carrying bodies at the same time is acceptable without seriously affecting the efficiency of the system.

In a further example a total length of the pair of radiating cables, when measured along the transport direction of the conveyor, exceeds 100 meter and preferably is smaller than 300 meter.

As the radiating cables "leak" signals, to be picked up by the moveable controllers, the strength of the signal diminishes with increasing length. When the radiating cable becomes longer and longer, the signal power from the AP to the radiating cable should become higher and higher to have a sufficiently strong signal at the end of the cable. In practice, it is found that a maximum length of about 150 meter, or preferably a maximum length of about 125 meter per cable is optimal. As the cables of the pair extend in opposite directions, this leads to a maximum total length of about 300 meter, preferably about 250 meter per pair.

In a further example, the system comprises a further, second, pair of stationary radiating cables, connected to a further, second, AP, such that the system comprises at least two pairs of stationary radiating cables and at least two APs. In this example, the pairs of cable may be arranged one after another, partially overlapping or directly behind each other, and a length of the path may be at least 200 meter.

In a further example a length of the radiating cable that extends along the transport direction with respect to the AP is between 50% and 200%, preferably between 70% and 150%, more preferably between 90% and 110% of the length of the radiating cable that extends against the transport direction with respect to the AP.

The radiating cable extending in the direction against the transport direction preferably has about the same length as the radiating cable extending in the transport direction. However, in principle it is also possible that one of the cables is e.g. up to three times longer, or up to two times longer than the other cable. Preferably the outer end of one of the cables extends until a start point of the path while the outer end of the other of the cables extends until an end of the path, with the AP arranged in between these ends.

In a further example the system additionally comprises a second pair of stationary radiating cables arranged in communication with the AP, the second pair of radiating cables being arranged parallel to the first pair of stationary radiating cables, one radiating cable of the second pair extending in the transport direction with respect to the AP and the other radiating cable of the second pair extending against the transport direction with respect to the AP, the second pair of radiating cables arranged for communication with the plurality of moveable controllers.

The present example is related to the situation wherein there are two pairs of stationary cables arranged parallel to each other, i.e. next to each other when seen from above. Both pairs may be connected to one and the same AP, although (as described in the below) the two pairs may also be connected to two different APs. When there are two pairs of radiating cables, a redundant system is advantageously provided wherein a failure in one of the cables does not lead to a failure of the system as the function of the failed cable can be overtaken by the redundant cable. This leads to considerably lower downtime of the system as a whole.

In a further example, the system additionally comprises a second stationary Access Point, AP, arranged to communicate with the central control server and connected to the first pair of stationary radiating cables.

In this way, a redundant system is provided wherein a failure in one of the APs does not lead to a failure of the system as the function of the failed AP can be overtaken by the redundant AP. This leads to considerably lower downtime of the system as a whole.

In a yet further example, the system comprises two pairs of radiating cables, the cables arranged parallel to each other (as described in the above) as well as two APs (as described in the above) and wherein each of the radiating cables is connected to each of the APs. This provides an optimal redundancy and, additionally, allows multiple inputs to be send and multiple outputs to be received.

When there are two APs, preferably a communication frequency band of the first AP differs from a communication frequency over the second AP. When a radiating cable is connected to more than one AP, preferably the two different frequencies bands have non-overlapping frequency ranges, to avoid interference.

Preferably, each of the frequency bands is within the 5 GHz band, in particular between 5.1 GHz and 5.8 GHz. Advantageously this bandwidth, at present, is relatively underexploited and therefore relatively little interference with other signals (i.e. "noise") will occur when this frequency band is used.

As stated in the above, preferably a length of a radiating cable is at most 150 meter.

In a further example, each of the one or more controllers is arranged for controlling pusher body displacement devices based on sorter parameters, wherein the sorter parameters are any of:
  an outfeed angle, i.e. an angle between a transport direction and an outfeed direction, of an outfeed connected to the system;
  a width of the outfeed;
  a location of the outfeed;
  expected speed of the product to be sorted on the outfeed.

Here, each of the plurality of controllers may be arranged for determining a sorting profile for a corresponding pusher body based on any of the sorter parameters, wherein the sorting profile relates to a position of the pusher body with respect to its corresponding elongated carrying body.

The inventors have found that it may be beneficial to take into account the sorting parameters, for determining an effective manner for pushing a particular product off of the corresponding elongated bodies.

The sorting parameters relate to parameters of the system itself, like the outfeed angle, the width of the outfeed, the location of the outfeed and/or the expected speed of the product to be sorted on the outfeed. These kinds of parameters may be taken into account when sorting a particular product, i.e. when pushing a particular product off of the corresponding elongated bodies.

For example, the expected speed of the product to be sorted on the outfeed may be taken into account by the controller for determining the exit speed of the corresponding pusher body. That is, it may be beneficial if the exit speed of the corresponding pusher body is tuned to the expected speed of the product to be sorted.

In an example, each of the controllers is arranged for:
  controlling a corresponding pusher body, via the pusher body displacement device, to an initial position such that the corresponding pusher body is against, or close to, a product to be sorted;
  sorting the product to be sorted by controlling the pusher body displacement device, at the sorting location, such that the corresponding pusher body follows the sorting profile starting from the initial position.

It was found that it may be beneficial to control the pusher bodies to an initial position and that, in a second step, the product is to be sorted in such a way that the corresponding pusher bodies follow a determined, or predetermined, sorting profile. The sorting profile may be determined by the controllers based on the sorting parameters, or may be predetermined by, for example, an operator of the system. The above allows for an efficient way of sorting the product, wherein the risk of any errors is reduced.

A second aspect of the present invention relates to a method of sorting a product to be sorted, using a system as described in the above, wherein the method comprises the steps of:
- receiving, by one of the controllers, from the central control server via the at least one stationary AP and the stationary radiating cable, destination data relating to the sorting location where the product to be sorted is to be pushed off of the carrying body;
- controlling, by one of the controllers, any of the pusher body displacement devices at the sorting location by driving the corresponding electric motor in accordance with the received destination data.

It is noted that the advantages and definitions as disclosed with respect to the embodiments of the first aspect of the invention also correspond to the embodiments of the second aspect of the invention, being the method of sorting a product to be sorted.

In an example, the step of receiving comprises:
- receiving at least one sorter parameter, wherein the sorter parameter is any of:
  - an outfeed angle, i.e. an angle between a transport direction and an outfeed direction of an outfeed connected to the system;
  - a width of the outfeed;
  - a location of the outfeed;
  - expected speed of the product to be sorted on the outfeed;
  and wherein the step of controlling is further based on any of the sorter parameters.

A third aspect of the present invention relates to a computer program product comprising a computer readable medium having instructions stored thereon which, when executed by a controller, cause the controller to implement a method in accordance with the above.

BRIEF DESCRIPTION OF THE DRAWINGS

The invention will be explained in more detail hereunder on the basis of the description of a number of possible embodiments of the invention, referring to the following figures wherein like parts and features are denominated with like reference numerals.

DETAILED DESCRIPTION

Figure 1:
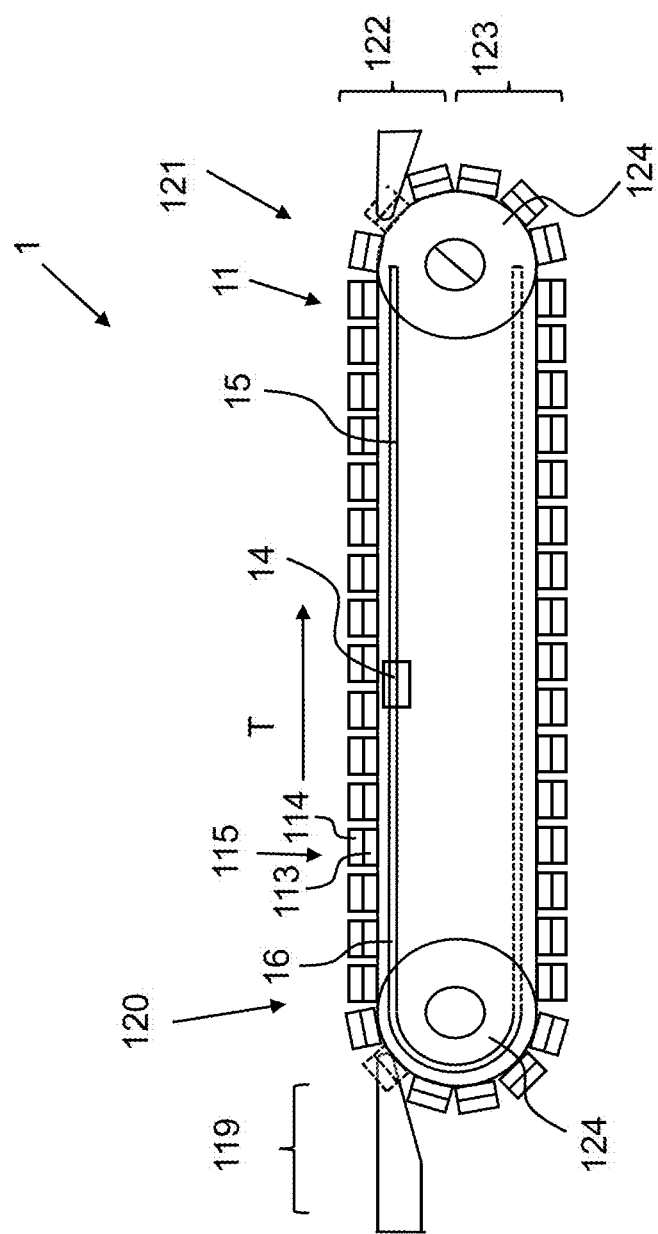
FIG. 1 schematically shows in a side view a system for sorting products in accordance with the present disclosure.

FIG. 1 shows in a side view a highly schematic overview of a system 1 for sorting products, although no products are shown in FIG. 1. The system 1 comprises a conveyor 11, which is of the endless type. The conveyor 11 is here driven by two conveyor displacement devices 124, although one of them might be a guide while whereas only the other actually drives the conveyor 11. Indeed, typically a conveyor displacement device will only be present at a downstream side of the conveyor, near an end point of the transport path. The conveyor 11 is driven in a transport direction T. In the figure the length of the conveyor 11 seems relatively small (at least compared to the height), but one skilled in the art will understand that in reality the length is in principle unbounded and may e.g. be several hundreds of meters, e.g. more than 100 meter, such as 200 meter, 250 meter, 300 meter or longer. The conveyor 11 has an upper loop portion 122 which moves—in operation—in the transport direction T from a start point 120 of the path of the conveyor 11 to an end point 121 of the path of the conveyor and carries products. The conveyor 11 also has a return loop portion 123 which moves against the transport direction T, from the end point 121 of the path back to the start point 120 of the path.

In the figure, the path is shown as a rectilinear path, but one of skill in the art will understand that the path may alternatively have all kinds of twists, turns, curves, and other non-linear parts. The conveyor 11 as shown here has two conveyor displacement devices 124, but one of skill in the art will understand that, especially when the conveyor 11 is relatively long, more conveyor displacement devices 124 may be provided and the conveyor 11 may comprises several sections of e.g. endless loops.

Provided near the start point 120 of the path is an infeed 119. Provided along the path are several outfeeds and sorting locations, as will be described in more detail in the below.

Further shown in FIG. 1 are a number of carrying-pusher body combinations 115, although only one is referenced a great number of such combinations 115 may be recognized. The combinations 115, only visible from the side in this view, extend in a direction perpendicular to the transport direction T and are arranged one after another, the different combinations 115 extending parallel to each other. The combinations 115, as discussed in more detail below, comprise a carrying body 113, hereinafter referred to as slat, on which a product is carried and a pusher body 114, hereinafter referred to as shoe, with which a carried product can be pushed off of the slat.

Further visible along the path is an Access Point, AP, 14, a radiating cable 15 extending in the transport direction T with respect to the AP 14 as well as a radiating cable 16 extending opposite to the transport direction T with respect to the AP 14. The function of these radiating cables 15, 16 and the AP 14 is to be discussed in the below.

Figure 2:
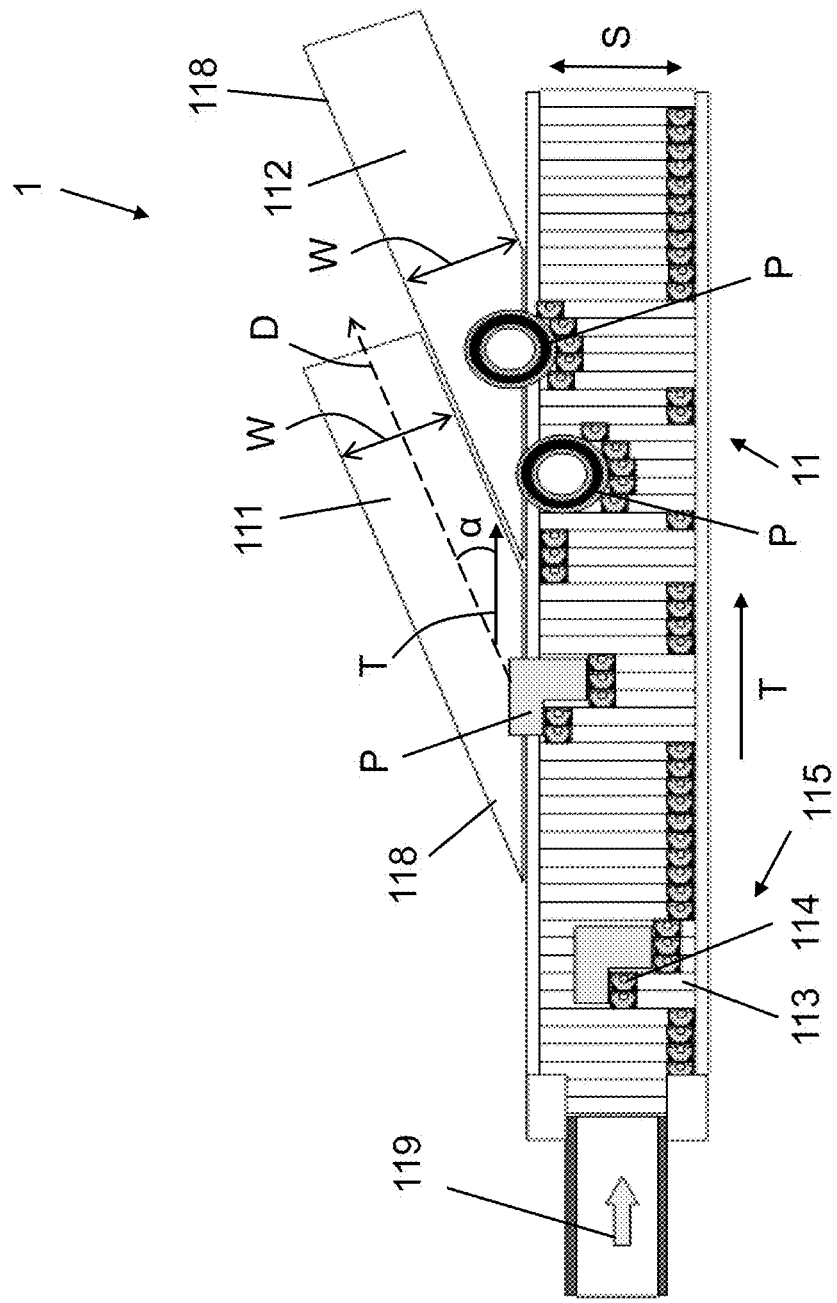
FIG. 2 schematically shows in a top view a system for sorting products in accordance with the present disclosure.

Turning to FIG. 2, a top view of the system 1 is shown, with only the upper loop of the conveyor 11 shown. Again visible, near the start point of the path defined by the conveyor 11 is an infeed 119. From the infeed 119, products P are placed on the conveyor 11. The conveyor 11, as is now better visible, comprises a number of slats 113, of which only one is indicated but of which a great number are present, as evidenced by e.g. FIG. 1. The slats 113 are located one after another and extend parallel to each other, in a direction perpendicular to the transport direction T. As shown, the slats 113 carry products P of all sizes and shapes. As is typical, but not necessary, one product P is carried by several slats 113. As is also well visible, each slat 113 is associated with a shoe 114. As explained above with reference to FIG. 1, the shoes 114 and slats 113 form a carrying-pusher body combination 115, hereinafter simply referred to as combination. As will be derived from the figure, the position of the shoes 114 on the slats 113 is not static, but the shoes 114 can move with respect to the slats 113, in particular in a sorting direction indicated as S, in a manner known to a person skilled in the art. The sorting direction S is here perpendicular to the transport direction T, and in general will be transverse to the transport direction T although a perpendicular orientation is not required.

Shown along the path are two sorting locations 111, 112. At the sorting locations 111, 112 outfeeds 118 are provided, which outfeeds 118 may collect the products P in a way that is known in the art. As described in more detail below, a central control server controls operation of the shoes 114 so that the products P are pushed off of the conveyor 11 at the "correct" or "desired" sorting location 111, 112.

More specifically, operation of the shoes 114 may be based on so-called sorting parameters, which may be any of an outfeed angle α, i.e. an angle between a sorting transport direction T and an outfeed direction D, of the outfeed 118 and/or a width W of the outfeed 118 and/or a sorting location 111, 112 of the outfeed 118 and/or an expected speed of the product to be sorted on the outfeed 118.

In particular, one or more controllers may be provided as a part of the system (to be described in the below), each of the controllers being arranged for determining a sorting profile for a corresponding shoe 114 controlled by the controller based on any of the above-mentioned sorter parameters, wherein the sorting profile in particular relates to a position of the shoe 114 with respect to its corresponding slat 113 of combination 115.

One particular advantage of the presented system is that, in this way, each shoe 114 may be controlled separately, individually and independently such that the sorting process can be tailored to each individual product.

Figure 3:
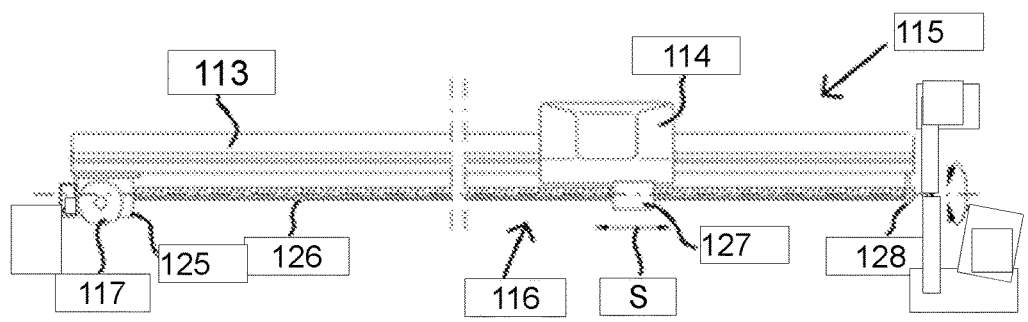
FIG. 3 schematically shows a side view of a carrying-pusher body combination forming part of a system for sorting products in accordance with the present disclosure.

Turning now to FIG. 3, one of many ways in which the shoe 114 may be moved with respect to the slat 113 is shown. It is noted that, besides the particular embodiment shown here, many other, non-shown, ways to move shoe 114 with respect to slat 113 are known to the person skilled in the art and the present disclosure is in no way limited to a particular manner of operating shoe 114. Examples of such non-shown methods include a belt transmission and a direct transmission by a servomotor provided in or on shoe 114.

FIG. 3 then shows a combination 115 of a slat 113 and a shoe 114 moveable relative to slat 113 in two opposite sorting directions S. For said movement, combination 115 is provided on the underside of slat 112 with a pusher body displacement device 116, in this particular example a spindle transmission. The spindle transmission 116 includes a threaded spindle 126 and a nut 127 that surrounds threaded spindle 126 and engages therewith. Nut 127 is connected to pusher shoe 114, on the underside thereof. The pusher body displacement device 116 further comprises a servomotor 117, which is an electric motor, which, via right-angled transmission 125, rigidly connects with slat 113 to one end thereof, and is coupled to one end of threaded spindle 126.

At the opposite end, threaded spindle 126 is mounted rotatably in bearing body 128, which is connected rigidly to slat 113. Excitation of electric motor 117 results in threaded spindle 126 rotating about the non-numbered centre line in one of the two directions shown by the rotating and double-headed arrow. Nut 127 is moved thereby in a sorting direction S. On account of the coupling between nut 127 and pusher shoe 114, shoe 114 will therefore also move in one of the two oppositely directed sorting directions 4, parallel to the longitudinal direction of the slat 113.

The servomotor 117 may e.g. be powered by a battery, which is not shown here. Charging of such a battery may for example be inductive, and thus contactless, or by means of sliding contacts.

Figure 4:
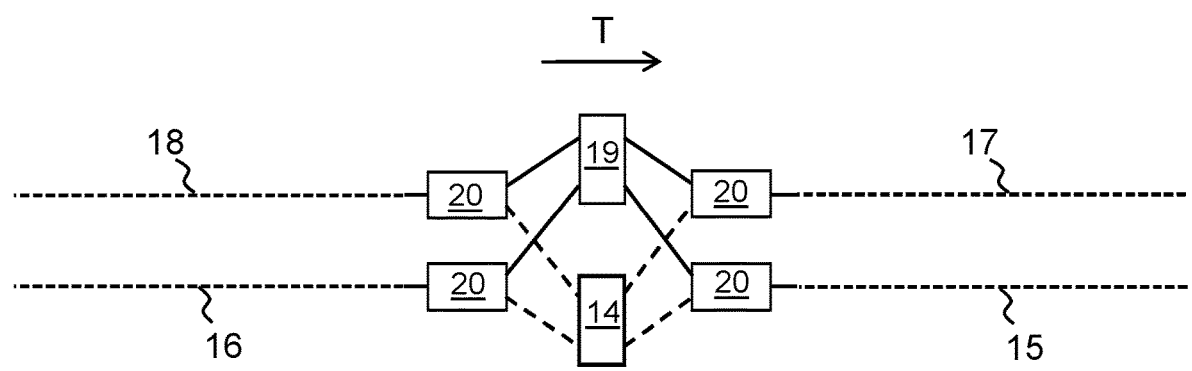
FIG. 4 schematically shows a high level design of a part of the communication architecture provided as part of the system for sorting products in accordance with the present disclosure.

Turning now to FIG. 4, the basic principle underlying the present invention is schematically shown. Although the basic principle of the present invention is defined in the claim 1, a more advantageous embodiment, comprising more features than required by the claims, is shown in FIG. 4. Shown in FIG. 4 are two Access Points 14, 19, each connected, via combiner 20, at both sides to two radiating cables 15, 16, 17, 18, hereinafter to be referred to as leaky coax cables 15, 16, 17, 18. Not shown in FIG. 4 is that the leaky coax cables 15, 16, 17, 18 in practice will be arranged parallel to the conveyor (indicated by the general reference T, referring to the transport direction of the conveyor). The leaky coax cables 15, 16, 17, 18 are arranged in pairs. A first pair is formed by upper leaky coax cables 17, 18 and a second pair is formed by lower leaky coax cables 15, 16. The pairs are arranged in parallel to each other. Each pair has one leaky coax cable 15, 17 that extends in the direction of transportation T with respect to the APs 14, 19 and another leaky coax cable 16, 18 that extends in the opposite direction of the transport direction T with respect to the APs 14, 19.

A total length of one leaky coax cable 15, 16, 17, 18, measured from where it is connected to combiner 20 to the opposite end thereof, may be up to 150 meter, e.g. about at most 125 meter. A total length of one pair of leaky coax cables, measured from the outer end away from combiner 20 of the cable 16, 18 extending against the transport direction T to the outer end away from combiner 20 of the cable 15, 17 extending in the transport direction T, may be up to 300 meter and may e.g. be longer than 100 meter.

A length of the leaky coax cable 15, 17 that extends in the transport direction T may be approximately equal to the length of the leaky coax cable 16, 18 that extends in the opposite direction. Alternatively, one of the cables may be up to three times, e.g. up to two times, longer than the other cable.

A communication frequency band of the first AP 14 may differ from a communication frequency band of the second AP 19.

Figure 5:
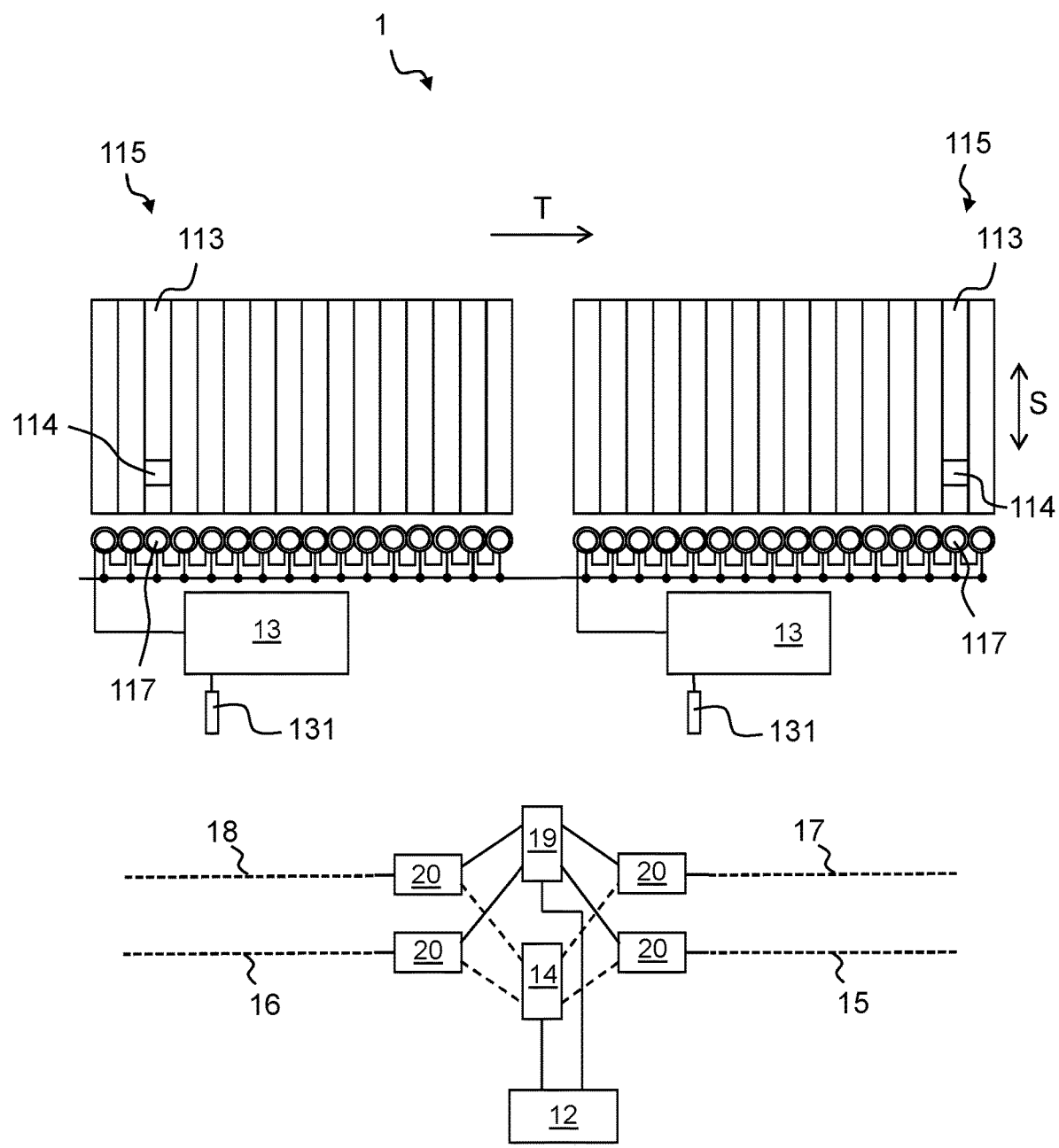
FIG. 5 schematically shows a high level design of another part of the communication architecture provided as part of the system for sorting products in accordance with the present disclosure.

Turning now to FIG. 5, a number of slats 113 is shown again (although only two are referenced). Each of the slats 113, or only some of them, are associated with a shoe 114, of which again only two are shown in this figure. The slats 113, as explained, form the conveyor and move in the transport direction T. The shoes 114, as explained are moveable with respect to the slats 113 in the sort direction S transverse to the transport direction T. Products are transported on the conveyor, although none are shown in FIG. 5.

Shown schematically at the bottom of the figure, but not necessarily present in the same room or building as the conveyor, is a central control server 12. The central control server 12 is the "master" of the communication architecture, the element that ultimately determines in which way the shoes 114 should be operated by transmitting destination data relating to a sorting location where a product to be sorted is to be pushed off of the carrying body 113 on which it lies. The central control server 12 is communicatively connected to a first AP 14 and a second AP 19. Each of the APs 14, 19 is connected to a pair of leaky coax cables 15, 16, 17, 18. The first AP 14 is connected to a first pair of leaky coax cables 15, 16 via combiners 20 and the second AP 19 is connected to a second pair of leaky coax cables 17, 18 via combiners 20. Of each pair, one leaky coax cable 15, 17 extends in the transport direction T and one leaky coax cable 16, 18 extends opposite to the transport direction T.

Whereas the APs 14, 19 and the leaky coax cables 15, 16, 17, 18 are stationary with respect to the fixed world, the elements associated with the conveyor, among them the combinations 115, the shoes 114, the slats 113, the electric motors 117, the controllers 13, and the controller antennas 131, move with respect to the fixed world. The leaky coax cables 15, 16, 17, 18 provide communication between this fixed world and these moving components, by communicating with the controllers 13, e.g. with the antennas 131 thereof. For example, the antenna may be a built-in antenna.

The controllers 13, this way arranged in communication with the central control server 12, picks up the destination data transmitted by the central control server 12 and, in response to said destination data controls an operation of two or more of the electrical motor 117 associated with the shoes 114.

As can be seen in the figure, each controller 13 controls a number of electric motors, e.g. up to 32 of them. Advantageously, the group of electric motors 117 controlled with one controller 13 are coupled to each other in a daisy chain configuration.

As will be appreciated by one of skill in the art, each of the controllers 13 in this way is arranged for:
- controlling a shoe 114, via the pusher body displacement device and the electric motor associated therewith, to an initial position such that the corresponding shoe is against, or close to, a product to be sorted; and
- sorting the product to be sorted by controlling the pusher body displacement device, in particular the electric motor 117 thereof, at the sorting location, such that the corresponding shoe follows an established sorting profile starting from the initial position.

The controllers 13 may e.g. comprise a microprocessor or a Field Programmable Gate Array (FPGA). The controllers 13 are configured for at least receiving data, for example directly from the central control server, relating to the sorting location 111, 112 where a product to be sorted should be pushed from the associated slat 113 and relating to the position of the combination 115 viewed in the direction of transportation T at least in the sorting path, and for controlling the associated servomotor 117.

The controller 13 may further be configured with a ROM and/or RAM memory for storing data relating to the aforementioned sorting location and for determining the longitudinal position of the shoe relative to the associated slat.

As for power transmission, power rails may be fitted on one of the side frames of the sorter. Current collectors may be fitted on the moving carriers and connected to power pickup units fixed on the carriers.

LIST OF REFERENCE NUMERALS

1 System for sorting products
  11 conveyor
    111 sorting location
    112 sorting location
    113 carrying body
    114 pusher body
    115 carrying-pusher body combination
    116 pusher body displacement device
    117 electric motor
    118 outfeed
    119 infeed
    120 start point of path
    121 end point of path
    122 upper loop
    123 return loop
    124 conveyor displacement device
    125 transmission pusher body displacement device
    126 threaded spindle
    127 nut
    128 bearing body
  12 central control server
  13 controller
    131 antenna
  14 Access Point
  15 radiating cable
  16 radiating cable
  17 radiating cable
  18 radiating cable
  19 Access Point
  20 combiner
α angle between outfeed direction and transport direction
D outfeed direction
P product
S sorting direction
T transport direction
W outfeed width

The invention claimed is:

1. A system 1 for sorting products, comprising:
a conveyor that is moveable in a transport direction over a path along which a number of sorting locations are provided, the conveyor comprising a number of elongated carrying bodies located one after another and extending in a direction perpendicular to the transport direction parallel to each other, the carrying bodies being configured for carrying the products to be sorted, all or a subset of the carrying bodies being associated with a pusher body to form a carrying-pusher body combination;
each carrying-pusher body combination being provided with a pusher body displacement device comprising an electric motor, for moving the pusher body along a carrying body of the carrying bodies in a sort direction transverse to the transport direction, for pushing a product carried by the carrying body off of the carrying body;
a central control server arranged for transmitting destination data relating to a sorting location where a product to be sorted is to be pushed off of the carrying body;
a plurality of controllers, arranged in communication with the central control server and moveable in the transport direction along with a carrying body or a group of carrying bodies, each one of the controllers being arranged to control two or more of the electrical motors of the pusher body displacement devices in accordance with the destination data received from the central control server;
at least one stationary Access Point (AP) arranged to communicate with the central control server;
a first pair of stationary radiating cables connected to the AP, one radiating cable of the first pair of stationary radiating cables extending in the transport direction with respect to the AP and the other radiating cable of the first pair of stationary radiating cables extending against the transport direction with respect to the AP, the first pair of stationary radiating cables arranged for communication with the plurality of controllers; and
a second pair of stationary radiating cables arranged in communication with the AP, the second pair of stationary radiating cables being arranged parallel to the first pair of stationary radiating cables, one radiating cable of the second pair of stationary radiating cables extending in the transport direction with respect to the AP and the other radiating cable of the second pair of stationary radiating cables extending against the transport direction with respect to the AP, the second pair of stationary radiating cables arranged for communication with the plurality of controllers.

2. The system according to claim 1, wherein each controller of the plurality of controllers is arranged to control at most 32 of the pusher body displacement devices.

3. The system according to claim 1, wherein a total length of the first pair of stationary radiating cables, when measured along the transport direction of the conveyor, exceeds 100 meters.

4. The system according to claim 1, wherein a length of a radiating cable of the first pair of stationary radiating cables that extends in the transport direction with respect to the AP is between 50% and 200% of the length of the radiating cable that extends against the transport direction with respect to the AP.

5. The system according to claim 1, further comprising a second stationary Access Point arranged to communicate with the central control server and connected to the first pair of stationary radiating cables.

6. The system according to claim 5, wherein a communication frequency band over a first AP differs from a communication frequency band over the second AP.

7. The system according to claim 1, wherein a length of a radiating cable is at most 150 meter.

8. The system in accordance with claim 1, wherein each controller of the plurality of controllers is arranged for controlling pusher body displacement devices based on at least one sorter parameter, wherein the at least one sorter parameter is at least one of:
an outfeed angle ($\alpha$) between a transport direction and an outfeed direction, of an outfeed connected to the system;
a width of the outfeed;
a location of the outfeed; or
expected speed of the products to be sorted on the outfeed.

9. The system in accordance with claim 8, wherein each controller of the plurality of the controllers is arranged for determining a sorting profile for a corresponding pusher body based on the at least one sorter parameter, wherein the sorting profile relates to a position of the pusher body with respect to its corresponding elongated carrying body.

10. The system in accordance with claim 9, wherein each controller of the plurality of controllers is arranged for:
controlling a corresponding pusher body, via a corresponding pusher body displacement device, to an initial position such that the corresponding pusher body is against, or close to, a product to be sorted; and
sorting the product to be sorted by controlling the pusher body displacement device, at a sorting location of the sorting locations, such that the corresponding pusher body follows the sorting profile starting from the initial position.

11. A method of sorting a product to be sorted, using the system according to claim 1, wherein the method comprises the steps of:
receiving, by one of the controllers, from the central control server via the at least one stationary AP and a stationary radiating cable, destination data relating to the sorting location where the product to be sorted is to be pushed off of the conveyor; and
controlling, by one of the controllers, any of the pusher body displacement devices at the sorting location by driving the corresponding electric motor in accordance with the received destination data.

12. The method in accordance with claim 11, wherein the step of receiving further include:
receiving at least one sorter parameter, wherein the sorter parameter is at least one of:
an outfeed angle ($\alpha$), between a transport direction and an outfeed direction of an outfeed connected to the system;
a width of the outfeed;
a location of the outfeed; or
expected speed of the product to be sorted on the outfeed;
and wherein the step of controlling is further based on the at least one sorter parameter.

13. A computer program product comprising a computer readable medium having instructions stored thereon which, when executed by a controller, cause the controller to implement a method in accordance with claim 11.

* * * * *